(12) United States Patent
Aljahdali et al.

(10) Patent No.: US 12,259,769 B2
(45) Date of Patent: Mar. 25, 2025

(54) SYSTEMS AND METHODS FOR REMOTE POWER MANAGEMENT OF A COMMUNICATION INFRASTRUCTURE DEVICE

(71) Applicant: SAUDI ARABIAN OIL COMPANY, Dhahran (SA)

(72) Inventors: Fahad A. Aljahdali, Riyadh (SA); Abdulaziz A. Amoudi, Riyadh (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 171 days.

(21) Appl. No.: 17/729,791

(22) Filed: Apr. 26, 2022

(65) Prior Publication Data
US 2023/0341917 A1    Oct. 26, 2023

(51) Int. Cl.
*G06F 1/30* (2006.01)
(52) U.S. Cl.
CPC .................................... *G06F 1/30* (2013.01)
(58) Field of Classification Search
CPC .......................................................... G06F 1/30
See application file for complete search history.

(56) References Cited

U.S. PATENT DOCUMENTS

| | | | |
|---|---|---|---|
| 6,453,423 B1 | 9/2002 | Loison | |
| 7,478,251 B1 * | 1/2009 | Diab | G06F 1/3209 713/340 |
| 7,818,800 B1 * | 10/2010 | Lemley, III | G06F 21/50 726/22 |
| 9,965,013 B1 * | 5/2018 | McGee | G06F 1/30 |
| 10,831,251 B1 * | 11/2020 | Ross | G06F 1/30 |
| 10,852,803 B2 * | 12/2020 | Hanna | G06F 1/3209 |
| 11,349,333 B1 * | 5/2022 | Totani | G06F 1/28 |
| 2001/0005894 A1 * | 6/2001 | Fukui | G06F 1/26 713/310 |
| 2006/0133368 A1 * | 6/2006 | Tolliver | H04L 12/44 370/389 |

(Continued)

FOREIGN PATENT DOCUMENTS

| | | |
|---|---|---|
| JP | 2013172631 A | 9/2013 |
| WO | 2015116048 A1 | 8/2015 |

OTHER PUBLICATIONS

Wikipedia, OSI model, Jun. 2020, pp. 2-8 (Year: 2020).*

(Continued)

*Primary Examiner* — Aurel Prifti
(74) *Attorney, Agent, or Firm* — Osha Bergman Watanabe & Burton LLP

(57) ABSTRACT

A system for automated control of a layer 2 or layer 3 communications infrastructure device connected to a first network located at a first site. The system includes a first uninterruptable power supply (UPS) at the first site configured to supply power to the layer 2 or layer 3 communications infrastructure device and powered by a first power source, and a network switch located at a core site remote from the communications infrastructure device, the network switch being communicatively connected to the first UPS. The network switch is configured to receive information indicative of a power event associated with the first power source and to send a shutdown command to the first UPS in response to detection of the power event.

17 Claims, 4 Drawing Sheets

(56) References Cited

U.S. PATENT DOCUMENTS

| | | | | |
|---|---|---|---|---|
| 2006/0186739 A1* | 8/2006 | Grolnic | .................... | H04L 12/10 |
| | | | | 307/64 |
| 2007/0005192 A1* | 1/2007 | Schoettle | ................ | H02J 9/062 |
| | | | | 700/286 |
| 2007/0022176 A1 | 1/2007 | Kobayashi | | |
| 2007/0210650 A1* | 9/2007 | Togashi | .............. | G06F 11/1441 |
| | | | | 307/43 |
| 2009/0251002 A1* | 10/2009 | Cohen | ..................... | H02J 9/062 |
| | | | | 307/23 |
| 2010/0102636 A1* | 4/2010 | Tracy | ........................ | H02J 9/06 |
| | | | | 307/80 |
| 2012/0023340 A1* | 1/2012 | Cheung | ................... | G06F 1/266 |
| | | | | 370/252 |
| 2012/0054507 A1* | 3/2012 | Noel | ................. | H04L 12/40032 |
| | | | | 713/300 |
| 2015/0365281 A1* | 12/2015 | Marino | ................... | H04L 69/22 |
| | | | | 713/150 |
| 2016/0181861 A1* | 6/2016 | Familiant | .............. | H02J 7/0048 |
| | | | | 307/66 |
| 2017/0110907 A1* | 4/2017 | Grehan | ..................... | G06F 1/30 |
| 2018/0123387 A1* | 5/2018 | Totani | ....................... | H02J 9/08 |
| 2020/0293101 A1* | 9/2020 | Krueger | .............. | G06F 11/2015 |
| 2021/0157387 A1* | 5/2021 | Debata | .................... | H02J 9/06 |
| 2021/0373633 A1* | 12/2021 | Maillot | ................. | H04L 67/568 |
| 2022/0011841 A1* | 1/2022 | Wee | .......................... | G06F 1/30 |
| 2022/0091941 A1* | 3/2022 | Sinha | ................. | G06F 11/1441 |
| 2022/0404885 A1* | 12/2022 | Kanjirathinkal | .......... | G06F 1/28 |
| 2023/0229223 A1* | 7/2023 | Wolford | .............. | H05K 7/1492 |
| | | | | 713/322 |

OTHER PUBLICATIONS

Cisco, what is WAN?, pp. 1-4, 2023 (Year: 2023).*

Amaxon, what is WAN, pp. 1-9, 2023 (Year: 2023).*

What is computer network? , Ramya Mohanakrishnan, 2022, pp. 1-3 (Year: 2022).*

L. F. Pollo and I. Jansch-PÔrto; "A Network-Oriented Power Management Architecture", IFIP/IEEE Eighth International Symposium on Integrated Network Management, 2003; pp. 693-706 (14 pages).

* cited by examiner

SYSTEMS AND METHODS FOR REMOTE POWER MANAGEMENT OF A COMMUNICATION INFRASTRUCTURE DEVICE

BACKGROUND

As the population has grown increasingly reliant on powered and power over ethernet (PoE) technology, power outages have become more disruptive. For example, power outages affecting communication infrastructure devices (CIDs) involved in the data link layer (layer 2) and network layer (layer 3) of the open systems interconnection (OSI) model, e.g., routers and switches, among other devices, may affect not only connected network consumer devices (e.g., servers, personal computers, etc.,) but the CIDs themselves. This is particularly true where a CID cannot be powered down quickly enough following a power event due to, for example, travel time to the physical location of the CID.

Typically, when a power event (e.g., a power outage, a fluctuation, etc.) occurs at a networked site, uninterruptable power supplies (UPS) installed at the site may provide stable power to the CIDs until electrical storage (e.g., batteries) are exhausted or primary power is restored. However, when the batteries are exhausted the CIDs may be forcibly and immediately shutdown in an improper manner resulting in possible damage to a CID. Similarly, when primary power is restored, a resulting power surge occurring at the CIDs may also damage a CID. Therefore, it is important that a technician be dispatched rapidly to a site at which a power event has occurred to manually shutdown each of the CIDs at the site to prevent possible damage.

While various systems and methods exist for shutting down devices participating in higher layers of the OCI model (e.g., networked computing devices) such systems and methods are not applicable to cases where it is desirable to shut down a CID (e.g., layer 2 and 3 devices providing data link and network services) from a location remote from the device.

SUMMARY

There exists a need to develop systems and methods for performing remote shutdown of communications infrastructure devices to facilitate such shutdown and to increase safety for personnel charged with maintaining such communications infrastructure devices.

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for automated control of a layer 2 or layer 3 communications infrastructure device connected to a first network located at a first site. The system includes a first uninterruptable power supply (UPS) at the first site configured to supply power to the layer 2 or layer 3 communications infrastructure device and powered by a first power source, and a network switch located at a core site remote from the communications infrastructure device, the network switch being communicatively connected to the first UPS. The network switch is configured to receive information indicative of a power event associated with the first power source and to send a shutdown command to the first UPS in response to detection of the power event.

The system may include a network management system (NMS) communicatively connected to the first site and the core site, and configured to generate the shutdown command in response to the network switch receiving the information indicative of a power event.

The network switch and the first UPS may be communicatively linked via a second network isolated from the first network.

The network switch and the first UPS may be communicatively linked via a wired connection.

The power event may include one or more of a power loss, a power fluctuation, and a power deviation.

The network switch may be powered by an isolated power source that is power isolated from the first power source.

The shutdown command may be configured to cause the first UPS to isolate the layer 2 or layer 3 communications infrastructure device from the first power source.

The system may further include a second layer 2 or layer 3 communications infrastructure device connected to a second network located at a second site remote from the first site and remote from the core site, a second UPS configured to provide power to the second layer 2 or layer 3 communications infrastructure device and powered by one of the first power source and a second power source, and a virtual network configured to operate on the network switch, wherein the first network and the second network are operably grouped within the virtual network.

The second UPS may be powered by the second power source, and wherein the second power source is isolated from at least the isolated power source.

The second network may be isolated from the first network.

The system may further include a network management system (NMS), wherein the network management system is configured to receive the information indicative of a power event and to automatically generate the shutdown command.

According to further embodiments of the disclosure, a method for automated control of a layer 2 or layer 3 communications infrastructure device connected to a first network located at a first site, is provided. The method includes receiving, at a network switch located at a core site remotely located from the first site, an indication of a power event associated with a first power source for a first uninterruptable power supply (UPS) powering the layer 2 or layer 3 communications infrastructure device, and transmitting, via a communication link between the network switch and the first UPS, a shutdown command to the first UPS to shut down the layer 2 or layer 3 communications infrastructure device.

A network management system (NMS) may generate the shutdown command and transmits the shutdown command via a virtual network operating on the network switch.

The power event may include one or more of a power loss, a power fluctuation, and a power deviation.

The shutdown command may cause one or more of a shutting down of the layer 2 or layer 3 communications infrastructure device and isolation of the first UPS and/or the layer 2 or layer 3 communications infrastructure device from the first power source.

The first power source may be power isolated from an isolated power source providing power to the network switch at the core site.

The method may further include monitoring, by the first UPS, the first power supply, and transmitting, by the first UPS to one or more of the network switch and the NMS, an indication of a power event upon detection of the power event.

The method may further include grouping the first network and a second network within the virtual network, the second network operating at a second site remote from the first site and the core site, receiving, by the network switch, an indication of a second power event associated with a second power supply for a second uninterruptable power supply (UPS) powering a second layer 2 or layer 3 communications infrastructure device of the second network, the second UPS being power isolated from the core site, generating, by the NMS and in response to the second power event, a shutdown command for the second UPS, and transmitting, via a direct communication link between the network switch and the second UPS, the shutdown command to the second UPS.

The method may further include one or more of transmitting a notification of the power event to a notification center, and recording the power event in a transaction log of the network switch.

According to still further embodiments of the specification, a system for automated control of plurality of layer 2 and layer 3 communications infrastructure devices distributed over a plurality of networked sites, is provided. The system includes a first site having a first network having a first layer 2 or layer 3 communication infrastructure device providing network services for the first network a first uninterruptible power supply (UPS) configured to provide power to the first layer 2 or layer 3 communication infrastructure device and powered by a first power source and a second site located remotely from the first site. The second site includes a second network having a second layer 2 or layer 3 communication infrastructure device providing network services for the second network, a second UPS configured to provide power to the second layer 2 or layer 3 communication infrastructure device and powered by one of the first power source and a second power source. The system further includes a core site comprising a network switch executing a virtual network, wherein the first network and the second network are grouped within the virtual network, wherein the network switch is powered by an isolated power source which is isolated from the first power source and the second power source, and a network management system (NMS) communicatively connected to the network switch, the first UPS, and the second UPS, and configured to receive information indicative of a power event associated with either of the first power source and the second power source, and to send a shutdown command to the first UPS and the second UPS, respectively in response to detection of the power event.

It is intended that combinations of the above-described elements and those within the specification may be made, except where otherwise contradictory.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
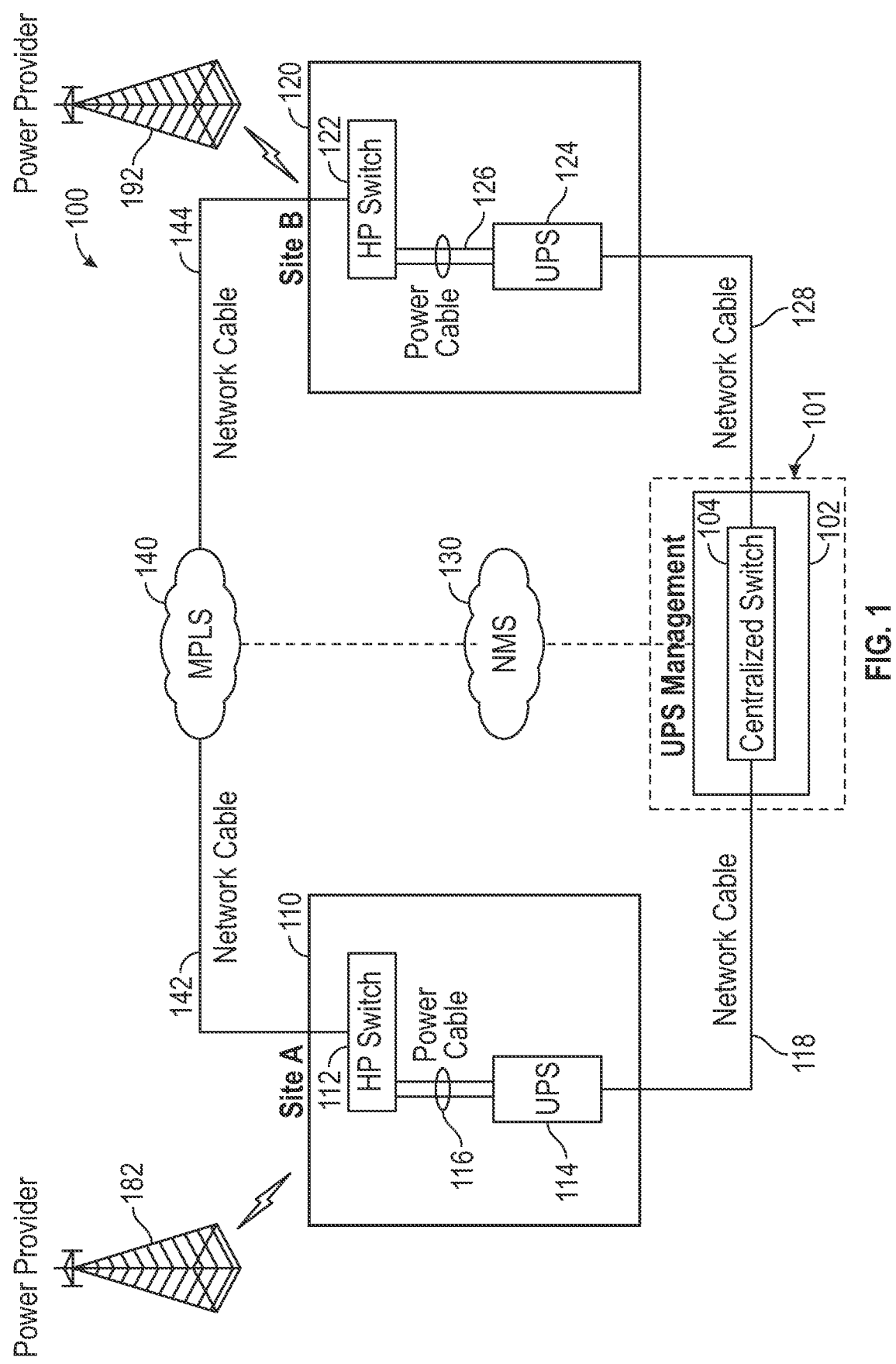
FIG. 1 is an illustrative system for remote power management of a communications infrastructure device, according to embodiments of the present disclosure.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to a rock sample includes reference to one or more such rock samples.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

According to some aspects, embodiments disclosed herein relate to systems and methods for remote power management of a communication infrastructure device. A dedicated local network located at an identified core site may be implemented to provide power control for one or more communications infrastructure devices (CIDs) (e.g., layer 2 devices and layer 3 devices of the open systems interconnection (OSI) model) providing network services at a site remotely located from the core site. As used herein, the term communication infrastructure device is intended to mean any device configured to provide network services, including, but not limited to, packet routing, packet switching, packet forwarding, etc. over a local area network (LAN), a wide area network (WAN), and combinations thereof. For example, layer 2 and layer 3 network devices such as known switches and routers correspond to such communication infrastructure devices (CIDs).

The disclosed systems and methods may be implemented to determine that a power event affecting one or more CIDs has occurred, and to subsequently shutdown affected CIDs remotely, either automatically or by remote user command. As used herein the term "power event" shall refer to any of a power loss (e.g., no power provided by a primary power provider), a power fluctuation (e.g., inconsistent voltage and/or current provided by a primary power provider), and a power deviation (e.g., an extended period of under/over-voltage provided by a primary power provider). As used herein, the term "remote" and variations thereon (e.g., "remotely") shall be understood to mean separated by a distance greater than 1 km. Embodiments of the present disclosure may provide the ability to safely shutdown a CID affected by a power event, and to limit the risk of subsequent damage during a forced shutdown and/or power restoration.

FIG. 1 is an illustrative system for remote power management of a communications infrastructure device, according to embodiments of the present disclosure. According to the example shown at FIG. 1, a core site 101 configured to provide power management control to one or more networked sites 110 and 120 is shown. While a first networked site 110 and a second networked site 120 are shown for purposes of explaining embodiments of the present disclosure, the number of networked sites 110, 120 is not intended to be limiting. Any number of networked sites 110, 120 may be provided and managed by a single core site 101. Further, based on embodiments of the present disclosure, a plurality of core sites 101 may also be implemented for controlling networked sites 110, 120, as desired. For example, where it is desired to obtain a certain level of isolation and/or scalability, two or more core sites 101 may be provided, each core site 101 being configured to control a distinct subset of networked sites 110, 120.

Each networked site 110, 120 may be remotely located from another networked site 110, 120, as well as located remotely from the core site 101. In addition, power isolation may be implemented between each of the networked sites 110, 120 and the core site 101. In other words, the networked sites 110, 120 and the core site 101 may not share a primary power provider 182, 192 (e.g., commercially available power).

Each networked site 110, 120 includes one or more CIDs 112, 122, configured to provide varying network functionality to connected devices at a respective site 110, 120. For example, a networked site 110 may include one or more network switches (layer 2 CID) and one or more routers (layer 3 CID) configured to receive and direct data from sources external to the networked site 110 to destinations internal to the networked site 110. The CIDs 112, 122 may be any suitable layer 2 or layer 3 communications device, and the description regarding network switches and routers is intended as illustrative.

The CIDs 112, 122 of each networked site 110, 120 may participate in a network 142, 144 to provide network services via wired and/or wireless connections to connected devices within the network 142, 144. For example, the CIDs 112, 114 may receive and route data via any suitable mechanism within the network infrastructure established at the networked site 110, 120, and may transmit and receive data to sources external to the networked site 110, 120 via, for example, a multi-protocol label switching scheme 140. The examples of network service functionality described as provided by the CIDs 112, 122 herein are intended as illustrative only, and are not to be considered limiting.

Each CID 112, 122 may further include an interface enabling communications related to power management, e.g., shutdown commands, to be received and processed. For example, a CID 112, 122 may include a processor configured to receive a message indicating the CID 112, 122 should undertake to terminate communications and initiate a controlled shut down of its operating system. Such commands may be received from any suitable source, for example, an uninterruptible power supply (UPS) 114, 124 providing power to a respective CID 112, 122.

Each networked site 110, 120, includes one or more UPSs 114, 124 providing electrical power (e.g., via cabling 116, 126) to the one or more CIDs 112, 122 installed at the networked site 110, 120. Each UPS 114, 124 is configured to receive power from a primary power source (e.g., commercially supplied power) and to provide electrical power to CIDs 112, 122 installed at the networked site 110, 120. Each UPS 114, 124 may include one or more electrical storage devices (e.g., battery) enabling the UPS 114, 124 to provide power to CIDs of the networked site 110, 120 for a period of time during which power from a primary power source is not available (e.g., during a power outage). For example, during a power outage, a UPS may be configured to provide electrical power to one or more CIDs for a time ranging between 2 and 8 hours, thereby allowing the CIDs to continue to provide network services to other devices operating at the networked site 110, 120 during the power outage.

Each UPS 114, 124 may be configured to output electrical power at desired output parameters (e.g., voltage, frequency, current, etc.) during availability of electrical power from the power storage devices. For example, each UPS 114, 124 may be configured to operate at voltage and frequency levels corresponding to those provided by commercially available power supply corresponding to primary power, in the location at which a respective UPS 114, 124 is installed (e.g., 110V, 60 Hz in the US; 220V, 50 Hz in Europe, etc.) Thus, each UPS 114, 124 may also act to "smooth" electrical power during periods of power fluctuations from a primary power supply 182, 192 to ensure operation of CIDs 112, 122 connected to a respective UPS 114, 124.

Each of the one or more UPSs 114, 124 is provided with a communications interface providing communications functionality to enable a respective UPS 114, 124 to transmit information related to operation of the respective UPS 114, 124. For example, a UPS 114, 124 may include an interchangeable communications module (e.g., a peripheral network card) that may be configured to receive data from the UPS 114, 124 (e.g., via sensors provided therein) indicating operating characteristics of the UPS 114, 124, and to transmit the operating characteristics of the UPS 114, 124 to one or more monitoring entities (e.g., at core site 101). According to embodiments of the present disclosure, operating characteristics such as voltage, current, frequency, etc. may be monitored by the UPS 114, 124 as well as a current external power status (e.g., primary power available or unavailable).

Additionally, the communications interface may be configured to receive information, e.g., commands, from the one or monitoring entities (e.g., at core site 101). For example, the communications interface of a UPS 114, 124 may receive a shutdown command from components (e.g., a network switch 104) at the core site 101, the shutdown command being configured to cause the UPS 114, 124 to shut down CIDs 112, 122 powered by the affected UPS 114, 124, and/or to power isolate connected CIDs 112, 122 from primary power (e.g., via a mechanical switch).

Communications may be transmitted and received by a respective UPS 114, 124 via any suitable network infrastructure 118, 128. For example, each UPS 114, 124 may be connected via a wired connection (e.g., RJ45, fiber, coaxial cable, etc.) to a terminating entity (e.g., at the core site 101) and communications transmitted and received by the UPS 114, 125 via the wired connection. Alternatively, or in addition, the network infrastructure 118, 128 may include a wireless connection (e.g., WiFi, 4G/5G, etc.) for UPS 114, 124, thereby enabling wireless communication between the UPS 114, 124 and a terminating site (e.g., the network switch 104 of the core site 101).

According to embodiments of the present disclosure, the network infrastructure 118, 128 over which communications to and from each UPS 114, 124 are sent and received is configured as a separate and distinct network from any of one or more networks 142, 144 operating at a networked site 110, 120. Each CID 112, 122 of a networked site 110, 120 is isolated from (i.e., not directly connected to) the network over which a respective UPS 114, 124 of the networked site 110, 120 is configured to communicate. Likewise, a respective UPS 114, 124 of a networked site 110, 120 does not transmit or receive data via a network provided by a powered CID 112, 122, and instead are terminated at the core site 101 (e.g., at a network switch 104 of the core site 101).

The core site 101 may be located remotely from one more networked sites 110, 120, and according to some embodiments, power for each of the one or more networked sites 110 and 120 may be isolated from power supplied to the core site 101.

The core site 101 includes, for example, an uninterruptable power supply (UPS) manager 102 and a network switch 104. The UPS manager 102 may be any suitable device configured to perform operations associated with monitoring and/or controlling of one or more remotely located UPSs installed at one or more networked sites 110, 120. For example, the UPS manager 102 may comprise a server computer configured to receive information from the one or more remote UPSs 114, 124 at the networked sites 110, 120 and to generate and/or transmit desired commands to the one or more UPSs 114, 124.

The UPS manager 102 may be communicatively linked with the network switch 104 and the NMS 130. For example, the UPS manager 102 may include one or more communication interfaces configured to send and receive data related to participating UPSs 114, 124 to/from NMS 130 and network switch 104.

The UPS manager 102 may be configured to determine, based on information received from the one or more remote UPSs 114, 124 via the network infrastructure 118, 128 whether a power event has occurred at a particular networked site 110, 120. For example, when primary power is lost at the networked site 110 and the UPS 114 is supplying power from its electrical storage device to CID 112, the UPS 114 may send a communication via the network infrastructure 118 indicating that primary power has been lost at the network site 110. The UPS manager 102 may receive such information and take action as described below based on the information.

The network switch 104 may be any suitable device providing networking functionality according to embodiments of the present disclosure. For example, network switch 104 may comprise a managed switch, a smart switch (also known as an intelligent switch), an enterprise managed switch, and a server executing software to cause the server to perform as a virtual switch. According to some embodiments, the network switch 104 may include logging functionality and may create one or more log files and/or data structures for storing log information (e.g., messages sent/received by the network switch 104). Such log files may be stored locally at the network switch 104 and/or at another suitable location (e.g., a server operating at remote site 101). For example, a server acting as a switch may include a database management system implementing a database, and logging of power events, shutdown commands, identities of affected CIDs, timestamps of events and shutdowns, among other things, may be logged to the database.

The network switch 104 may provide one or more modes to enable modification of the operation of the network switch 104 and functionality associated with the network switch 104. For example, network switch 104 may provide a command-line interface, telnet or Secure Shell, and/or an embedded Simple Network Management Protocol (SNMP) agent.

The network switch 104 may be configured to transmit a shutdown command to one or more UPSs 114, 124 at a networked site 110, 120 when a power event is determined. For example, when information is received from a UPS 114, 124 indicating the occurrence of a power event a shutdown command configured to cause the affected UPS 114, 124 to shut down a powered CID 112, 122. The shutdown command may further cause the UPS to power isolate a connected CID 112, 122 from the primary power switch, e.g., via a mechanical switch or other suitable power isolation device.

According to embodiments of the present disclosure, the network switch 104 may provide virtual LAN (VLAN) functionality enabling configuration of one or more VLANs to operate from the switch 104. The VLAN functionality may enable disparate networks (e.g., networks 118, 128) to be grouped together at the network switch 104, among other things.

The network switch 104 may be a dedicated network switch 104 configured for control of UPSs 114, 124 at the one or more networked sites 110, 120. In other words, the network infrastructure 118, 128 over which the UPSs 114, 124 communicate may be the only devices terminated at network switch 104, such that the network switch 104 provides network services for only the one or more UPSs 114, 124.

According to some embodiments, a network management system (NMS) 130 configured to provide automated monitoring and/or control services may be provided and connected to 130. For example, in conjunction with, or in the alternative to the UPS manager 102, the NMS 130 may be configured to receive the information indicative of a power event associated with a primary power source at a networked site 110, 120, (e.g., from UPS manager 102) and to send a shutdown command to a UPS 114, 124 affected by the power event in response to detection thereof. In such an example, the UPS manager 102 may perform a first analysis of power event data received from a UPS 114, 124 for a first determination.

Any suitable network management system 130 may be implemented without departing from the scope of the present disclosure. For example, one or more applications may operate on the network switch 104 and/or a server functioning as and/or terminating at the network switch 104 to provide network management functionality.

The network management system 130 may be configured to receive data originating within a network 142, 144 of a networked site, for example, from the MPLS 140. Such a configuration may enable a "double-check" of the health of a CID 112, 122 operating at a networked site 110, 120 affected by a power event.

Figure 2:
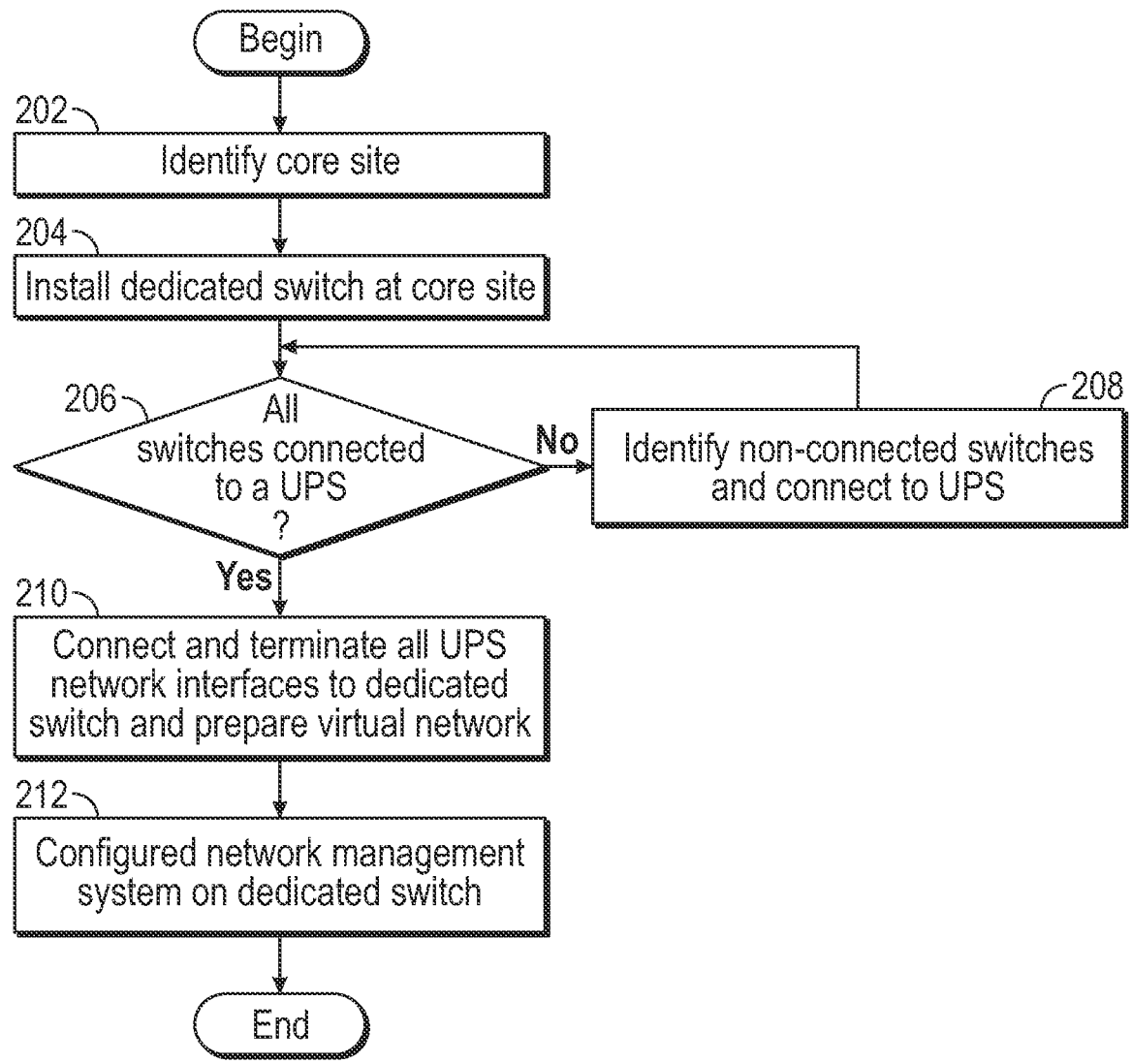
FIG. 2 is a flowchart highlighting an illustrative method for configuring a system for remote power management of a communications infrastructure device, according to embodiments of the present disclosure.

FIG. 2 is a flowchart highlighting an illustrative method for configuring a system for remote power management 100 of a CID 112, 122, according to embodiments of the present disclosure. Initially, a core site at which the network switch 102 and UPS manager 102 may operate may be identified (step 202). For example, a core site 101 may be identified at a remote location from a first networked site 110 and a second network site 120. Other considerations for a core site may be, for example, the ability to power isolate the core site 101 from the first networked site 110 and the second networked site 120, distance from the first and second networked sites 110, 120, etc.

A network switch 104 may then be installed at the core site 101 (step 204). According to some embodiments, the network switch 104 is dedicated to performing the functions described with regard to the present disclosure, and may not participate in or provide network services to any other network other than those networks used for communications between the UPSs installed at networked sites 110, and 120 (e.g., networks 118 and 128).

Further, each CID 112, 122 corresponding to a layer 2 and/or layer 3 device that is intended to be managed by the presently described remote power management system 100 is connected to a participating UPS 114, 124 (step 206). When a CID 112, 122 corresponding to a layer 2 and/or layer 3 device is identified that is not connected to a UPS (step 206: no) a UPS is either identified and/or provided, and the CID 112, 122 is connected thereto (step 208).

Once all of the CIDs 112, 122 have been connected to a UPS (step 206: yes), the UPSs 114, 124 participating in the remote power management system 100 has its respective communication interface terminated (e.g., ethernet cable termination) at the network switch 104 of the remote site 101. For example, each communication interface of a participating UPS 114, 124 may be connected via an RJ45 cable to the network switch 104 at the core site 101. The virtual network for the network switch 104 may then be configured to group each of the networks 118, 128 connected to the network switch 104 into a single virtual network to facilitate management by the network switch 104.

The network management system 130 may then be configured to recognize the virtual network and networks grouped therein, for performing remote power management (step 212) among other things. For example, the network management system 130 may be configured to determine a power event regarding a participating UPS 114, 124, and to respond (e.g., by generating a shutdown command) to the power event. In such a case, the power management system 130 may cause the response (e.g., the shutdown command) to the affected UPS 114, 124 via the network switch 104.

Figure 3:
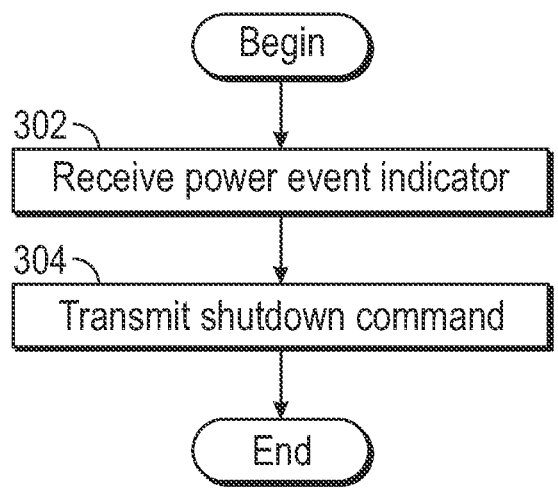
FIG. 3 is a flowchart showing a method for operating a system for remote power management of a communications infrastructure device, according to embodiments of the present disclosure.
Figure 4:
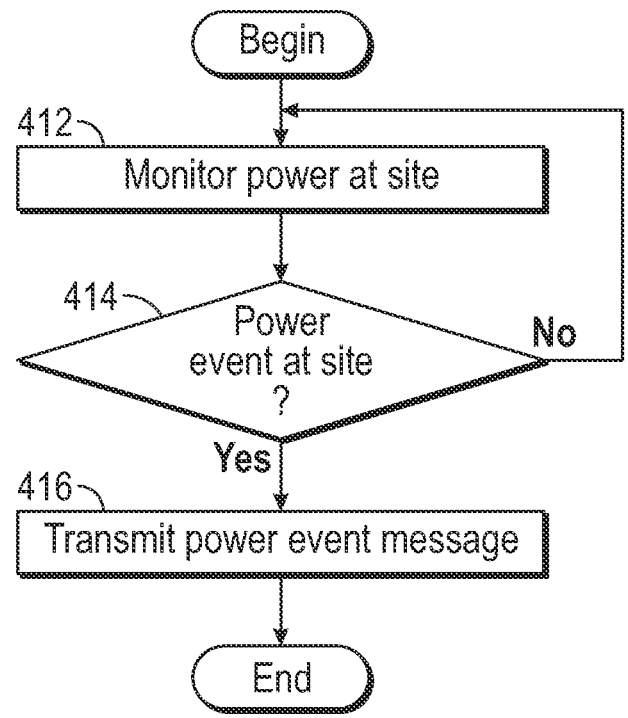
FIG. 4 is a flowchart showing another method for operating a system for remote power management of a communications infrastructure device, according to embodiments of the present disclosure.

FIGS. 3 and 4 are flowcharts highlighting methods for operating systems associated with remote power management of a communications infrastructure device, according to embodiments of the present disclosure. According to FIG. 3, information indicative of a power event from one or more UPSs 114, 124 may be received by the network switch 104 at the core site 101 (step 302). For example, a UPS 114, 124 may experience a loss of primary power, and may send a message via network 118, 128 to the network switch 104 indicating the loss of power. In response to the information a shutdown command may be transmitted to the respective UPS 114, 124 (step 304) causing the UPS to initiate a shutdown of each CID 112, 122 connected to the affected UPS 114, 124.

According to some embodiments, the network switch 104 may transmit the message to the NMS 130 for processing and the NMS may generate the shutdown command. For example, the shutdown command may include particular data and format according to the affected UPS to shut down.

In addition, various information (e.g., power events, shutdown commands, etc.) may be sent to a notification center, for example, a user monitored computing device for review by a user. For example, upon determining a power event and transmitting a shutdown command, a timestamped record may be transmitted to the notification center. The record may include the information received from an affected UPS as well as the timestamped shutdown command. Power restoration to a networked site 110, 120 following a power event may also be recorded and/or notified based on information received from an affected UPS monitoring primary power.

According to the method of FIG. 4, primary power at networked sites 110, 120 may be monitored, e.g., by a participating UPS 114, 124, to determine the occurrence of a power event (step 414). For example, a participating UPS may continually monitor voltage, current, frequency, etc. to determine whether the values are within a normal operating range as determined by a manufacturer of the respective UPS (step 414: no). When one or more of the monitored values deviates by more than a threshold among, the monitoring UPS 114, 124 may detect a power event (step 414: yes). The UPS may then transmit a power event message via its communication interface to the network switch 104 at core site 101 (step 416). The power event message may include information such as the state of primary power at the UPS 114, 124.

Figure 5:
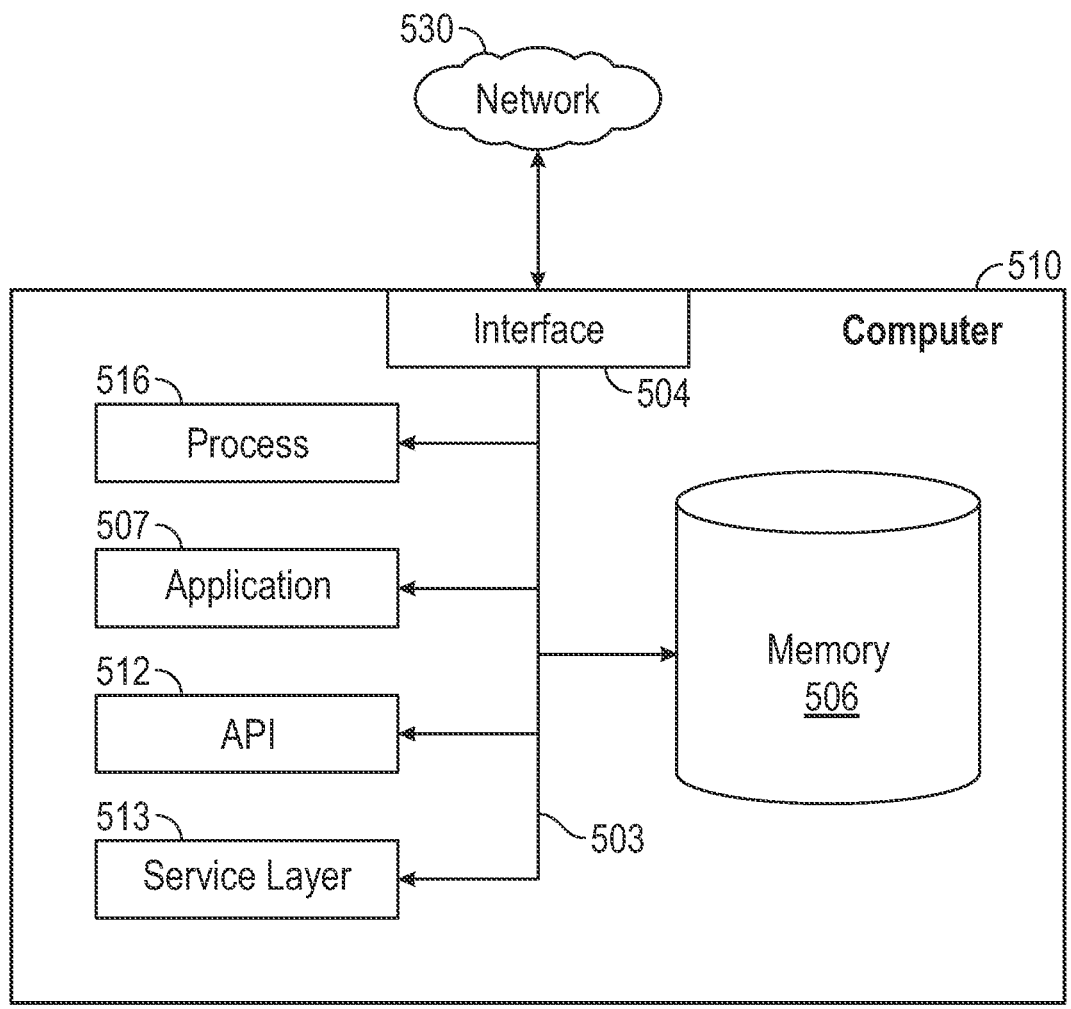
FIG. 5 shows an illustrative computing system that may be implemented as one or more components of the system of FIG. 1.

FIG. 5 is a block diagram of a computer 510 used to provide computational functionalities associated with described algorithms, methods, functions, processes, flows, and procedures as described in the instant disclosure, according to an implementation. The illustrated computer 510 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 510 may include a computer that includes an input device, such as a keypad, keyboard, touch screen, or other device that can accept user information, and an output device that conveys information associated with the operation of the computer 510, including digital data, visual, or audio information (or a combination of information), or a graphical user interface (GUI).

The computer 510 can serve in a role as a client, a network component, a server, a database or other persistency, or any other component (or a combination of roles) of a computer for performing the subject matter described in the instant disclosure. The illustrated computer 510 is communicably coupled with a network 530, corresponding to, for example, networks 118, 128 or networks 142, 144. In some implementations, one or more components of the computer 510 may be configured to operate within environments, including cloud-computing-based, local, global, or other environment (or a combination of environments).

At a high level, the computer 510 is an electronic computing device operable to receive, transmit, process, store, or manage data and information associated with the described subject matter. According to some implementations, the computer 510 may also include or be communicably coupled with an application server, e-mail server, web server, caching server, streaming data server, business intelligence (BI) server, or other server (or a combination of servers).

The computer 510 can receive requests over network 530 from a client application (e.g., executing on another computer 510) and responding to the received requests by processing the said requests in an appropriate software application. In addition, requests may also be sent to the computer 510 from internal users (for example, from a command console or by other appropriate access method), external or third-parties, other automated applications, as well as any other appropriate entities, individuals, systems, or computers.

Each of the components of the computer 510 can communicate using a system bus 503. In some implementations, any or all of the components of the computer 510, both hardware or software (or a combination of hardware and software), may interface with each other or the interface 504 (or a combination of both) over the system bus 503 using an application programming interface (API) 512 or a service layer 513 (or a combination of the API 512 and service layer 513. The API 512 may include specifications for routines, data structures, and object classes. The API 512 may be either computer-language independent or dependent and refer to a complete interface, a single function, or even a set of APIs. The service layer 513 provides software services to the computer 510 or other components (whether or not illustrated) that are communicably coupled to the computer 510.

The functionality of the computer 510 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or another suitable format. While illustrated as an integrated component of the computer 510, alternative implementations may illustrate the API 512 or the service layer 513 as stand-alone components in relation to other components of the computer 510 or other components (whether or not illustrated) that are communicably coupled to the computer 510. Moreover, any or all parts of the API 512 or the service layer 513 may be implemented as child or sub-modules of another software module, enterprise application, or hardware module without departing from the scope of this disclosure.

The computer 510 includes an interface 504. Although illustrated as a single interface 504 in FIG. 5, two or more interfaces 504 may be used according to particular desires or implementations of the computer 510. The interface 504 is used by the computer 510 for communicating with other systems in a distributed environment that are connected to the network 530. Generally, the interface 504 includes logic encoded in software or hardware (or a combination of software and hardware) and operable to communicate with the network 530. More specifically, the interface 504 may include software supporting one or more communication protocols associated with communications such that the network 530 or interface's hardware is operable to communicate physical signals within and outside of the illustrated computer 510.

The computer 510 includes at least one computer processor 516. Although illustrated as a single computer processor 516 in FIG. 5, two or more processors may be used according to particular desires or particular implementations of the computer 510. Generally, the computer processor 516 executes instructions and manipulates data to perform the operations of the computer 510 and any algorithms, methods, functions, processes, flows, and procedures as described in the instant disclosure.

The computer 510 also includes a memory 506 that holds data for the computer 510 or other components (or a combination of both) that can be connected to the network 530. For example, memory 506 may include a database storing data (e.g., log files) and/or processing instructions consistent with this disclosure. Although illustrated as a single memory 506 in FIG. 5, two or more memories may be used according to implementations of the computer 510 and the described functionality. While memory 506 is illustrated as an integral component of the computer 510, in alternative implementations, memory 506 can be external to the computer 510.

The application 507 is an algorithmic software engine providing functionality according to implementations of the computer 510, particularly with respect to functionality described in this disclosure. For example, application 507 can serve as one or more components, modules, applications, etc. configured to cause the computer 510 to function as a network switch, a router, or any other layer 2 or layer 3 network devices. Further, although illustrated as a single application 507, the application 507 may be implemented as multiple applications 507 on the computer 510. In addition, although illustrated as integral to the computer 510, in alternative implementations, the application 507 can be external to the computer 510.

There may be any number of computers 510 associated with, or external to, a computer system containing computer 510, each computer 510 communicating over network 530. Further, the term "client," "user," and other appropriate terminology may be used interchangeably as appropriate without departing from the scope of this disclosure. Moreover, this disclosure contemplates that many users may use one computer 510, or that one user may use multiple computers 510.

One or more of the embodiments of the present disclosure may be described as in the following clauses:

Clause 1. A system for automated control of a layer 2 or layer 3 communications infrastructure device connected to a first network located at a first site, the system comprising: a first uninterruptable power supply (UPS) at the first site configured to supply power to the layer 2 or layer 3 communications infrastructure device and powered by a first power source; and a network switch located at a core site remote from the communications infrastructure device, the network switch being communicatively connected to the first UPS, wherein the network switch is configured to receive information indicative of a power event associated with the first power source and to send a shutdown command to the first UPS in response to detection of the power event.

Clause 2. The system of clause 1, comprising: a network management system (NMS) communicatively connected to the first site and the core site, and configured to generate the shutdown command in response to the network switch receiving the information indicative of a power event.

Clause 3. The system of any of clauses 1-2, wherein the network switch and the first UPS are communicatively linked via a second network isolated from the first network.

Clause 4. The system of any of clauses 1-3, wherein the network switch and the first UPS are communicatively linked via a wired connection.

Clause 5. The system of any of clauses 1-4, wherein the power event comprises one or more of a power loss, a power fluctuation, and a power deviation.

Clause 6. The system of any of clauses 1-5, wherein the network switch is powered by an isolated power source that is power isolated from the first power source.

Clause 7. The system of any of clauses 1-6, wherein the shutdown command is configured to cause the first UPS to isolate the layer 2 or layer 3 communications infrastructure device from the first power source.

Clause 8. The system of clause 6, comprising: a second layer 2 or layer 3 communications infrastructure device connected to a second network located at a second site remote from the first site and remote from the core site; a second UPS configured to provide power to the second layer 2 or layer 3 communications infrastructure device and powered by one of the first power source and a second power source; and a virtual network configured to operate on the network switch, wherein the first network and the second network are operably grouped within the virtual network.

Clause 9. The system of clause 8, wherein the second UPS is powered by the second power source, and wherein the second power source is isolated from at least the isolated power source.

Clause 10. The system of clause 8, wherein the second network is isolated from the first network.

Clause 11. The system of any of clauses 1-10, further comprising a network management system (NMS), wherein the network management system is configured to receive the information indicative of a power event and to automatically generate the shutdown command.

Clause 12. A method for automated control of a layer 2 or layer 3 communications infrastructure device connected to a first network located at a first site, the method comprising: receiving, at a network switch located at a core site remotely located from the first site, an indication of a power event associated with a first power source for a first uninterruptable power supply (UPS) powering the layer 2 or layer 3 communications infrastructure device; and transmitting, via a communication link between the network switch and the first UPS, a shutdown command to the first UPS to shut down the layer 2 or layer 3 communications infrastructure device.

Clause 13. The method of clause 12, wherein a network management system (NMS) generates the shutdown command and transmits the shutdown command via a virtual network operating on the network switch.

Clause 14. The method of any of clauses 12-13, wherein the power event comprises one or more of a power loss, a power fluctuation, and a power deviation.

Clause 15. The method of any of clauses 12-14, wherein the shutdown command causes one or more of a shutting down of the layer 2 or layer 3 communications infrastructure device and isolation of the first UPS and/or the layer 2 or layer 3 communications infrastructure device from the first power source.

Clause 16. The method of any of clauses 12-15, wherein the first power source is power isolated from an isolated power source providing power to the network switch at the core site.

Clause 17. The method of any of clauses 13-16, further comprising: monitoring, by the first UPS, the first power supply; and transmitting, by the first UPS to one or more of the network switch and the NMS, an indication of a power event upon detection of the power event.

Clause 18. The method of any of clauses 13-17, comprising: grouping the first network and a second network within the virtual network, the second network operating at a second site remote from the first site and the core site; receiving, by the network switch, an indication of a second power event associated with a second power supply for a second uninterruptable power supply (UPS) powering a second layer 2 or layer 3 communications infrastructure device of the second network, the second UPS being power isolated from the core site; generating, by the NMS and in response to the second power event, a shutdown command for the second UPS; and transmitting, via a direct communication link between the network switch and the second UPS, the shutdown command to the second UPS.

Clause 19. The method of any of clauses 12-18, further comprising one or more of: transmitting a notification of the power event to a notification center; and recording the power event in a transaction log of the network switch.

Embodiments disclosed herein target the layer 2 and layer 3 devices in a network architecture and aim to protect a company's Layer 2/Layer 3 network devices through a sperate network. By connecting the UPS to a dedicated local network independent of the building network, an IT technician has the ability to safely shut down the power supply of Switch A remotely to protect it from the surge power. In addition, traveling time would be optimized specially for the long and unsafe trips.

While a number of illustrative embodiments have been described in detail above, those skilled in the art will readily appreciate that many modifications are possible in the example embodiments without materially departing from the scope of the present disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as illustrative only, with a true scope of the disclosure being indicated by the following claims.

What is claimed:

1. A system for automated control of a layer 2 or layer 3 communications infrastructure device connected to a first network located at a first site, the system comprising:
   a first uninterruptable power supply (UPS) at the first site configured to supply power to the layer 2 or layer 3 communications infrastructure device and powered by a first power source; and
   a network switch located at a core site remote from the communications infrastructure device, the network switch being communicatively connected to the first UPS,
   wherein the network switch is configured to receive information indicative of a power event associated with the first power source and to send a shutdown command to the first UPS in response to detection of the power event,
   wherein the network switch and the first UPS are communicatively linked via a second network isolated from the first network,
   wherein a network management system (NMS) communicatively connected to the first site and the core site is configured to generate the shutdown command in response to the network switch receiving the information indicative of a power event and transmits the shutdown command via a virtual network operating on the network switch, and
   wherein the virtual network is managed by the network switch.

2. The system of claim 1, wherein the network switch and the first UPS are communicatively linked via a wired connection.

3. The system of claim 1, wherein the power event comprises one or more of a power loss, a power fluctuation, and a power deviation.

4. The system of claim 1, wherein the network switch is powered by an isolated power source that is power isolated from the first power source.

5. The system of claim 1, wherein the shutdown command is configured to cause the first UPS to isolate the layer 2 or layer 3 communications infrastructure device from the first power source.

6. The system of claim 4, comprising:
   a second layer 2 or layer 3 communications infrastructure device connected to a second network located at a second site remote from the first site and remote from the core site;
   a second UPS configured to provide power to the second layer 2 or layer 3 communications infrastructure device and powered by one of the first power source and a second power source; and
   a virtual network configured to operate on the network switch, wherein the first network and the second network are operably grouped within the virtual network.

7. The system of claim 6, wherein the second UPS is powered by the second power source, and wherein the second power source is isolated from at least the isolated power source.

8. The system of claim 6, wherein the second network is isolated from the first network.

9. The system of claim 1, wherein the NMS is configured to receive the information indicative of a power event and to automatically generate the shutdown command.

10. A method for automated control of a layer 2 or layer 3 communications infrastructure device connected to a first network located at a first site, the method comprising:
    receiving, at a network switch located at a core site remotely located from the first site, an indication of a power event associated with a first power source for a first uninterruptable power supply (UPS) powering the layer 2 or layer 3 communications infrastructure device;
    and
    transmitting, via a communication link between the network switch and the first UPS, a shutdown command to the first UPS to shut down the layer 2 or layer 3 communications infrastructure device,
    wherein the network switch and the first UPS are communicatively linked via a second network isolated from the first network,
    wherein a network management system (NMS) communicatively connected to the first site and the core site generates the shutdown command and transmits the shutdown command via a virtual network operating on the network switch, and
    wherein the virtual network is managed by the network switch.

11. The method of claim 10, wherein the power event comprises one or more of a power loss, a power fluctuation, and a power deviation.

12. The method of claim 10, wherein the shutdown command causes one or more of a shutting down of the layer 2 or layer 3 communications infrastructure device and isolation of the first UPS and/or the layer 2 or layer 3 communications infrastructure device from the first power source.

13. The method of claim 10, wherein the first power source is power isolated from an isolated power source providing power to the network switch at the core site.

14. The method of claim 10, further comprising:
    monitoring, by the first UPS, the first power supply; and
    transmitting, by the first UPS to one or more of the network switch and the NMS, an indication of a power event upon detection of the power event.

15. The method of claim 10, comprising:
    grouping the first network and a second network within the virtual network, the second network operating at a second site remote from the first site and the core site;
    receiving, by the network switch, an indication of a second power event associated with a second power supply for a second uninterruptable power supply (UPS) powering a second layer 2 or layer 3 communications infrastructure device of the second network, the second UPS being power isolated from the core site;
    generating, by the NMS and in response to the second power event, a shutdown command for the second UPS; and transmitting, via a direct communication link between the network switch and the second UPS, the shutdown command to the second UPS.

16. The method of claim 10, further comprising one or more of:

transmitting a notification of the power event to a notification center; and recording the power event in a transaction log of the network switch.

17. A system for automated control of plurality of layer 2 and layer 3 communications infrastructure devices distributed over a plurality of networked sites, the system comprising:

a first site comprising:

a first network having a first layer 2 or layer 3 communication infrastructure device providing network services for the first network;

a first uninterruptible power supply (UPS) configured to provide power to the first layer 2 or layer 3 communication infrastructure device and powered by a first power source;

a second site located remotely from the first site and comprising:

a second network having a second layer 2 or layer 3 communication infrastructure device providing network services for the second network;

a second UPS configured to provide power to the second layer 2 or layer 3 communication infrastructure device and powered by one of the first power source and a second power source;

a core site comprising a network switch executing a virtual network, wherein the first network and the second network are grouped within the virtual network, wherein the network switch is powered by an isolated power source which is isolated from the first power source and the second power source; and a network management system (NMS) communicatively connected to the network switch, the first UPS, and the second UPS, and configured to receive information indicative of a power event associated with either of the first power source and the second power source, and to send a shutdown command to the first UPS and the second UPS, respectively in response to detection of the power event, wherein the network switch and the first UPS are communicatively linked via a second network isolated from the first network, wherein the network management system (NMS) generates the shutdown command in response to the network switch receiving the information indicative of a power event and transmits the shutdown command via a virtual network operating on the network switch, and wherein the virtual network is managed by the network switch.

* * * * *